United States Patent
Li et al.

(10) Patent No.: US 7,725,146 B2
(45) Date of Patent: May 25, 2010

(54) SYSTEM AND METHOD FOR PRE-PROCESSING WAVEFORMS

(75) Inventors: Li Li, Petaluma, CA (US); Scott Amundson, Oakland, CA (US); Michael Patrick O'Neil, Pleasanton, CA (US)

(73) Assignee: Nellcor Puritan Bennett LLC, Boulder, CO (US)

( * ) Notice: Subject to any disclaimer, the term of this patent is extended or adjusted under 35 U.S.C. 154(b) by 1273 days.

(21) Appl. No.: 11/240,926

(22) Filed: Sep. 29, 2005

(65) Prior Publication Data

US 2007/0073120 A1 Mar. 29, 2007

(51) Int. Cl.
*A61B 5/1455* (2006.01)
*A61B 5/02* (2006.01)

(52) U.S. Cl. .................... 600/336; 600/323; 600/500

(58) Field of Classification Search ............... 600/301, 600/310, 322–324, 336, 356, 529
See application file for complete search history.

(56) References Cited

U.S. PATENT DOCUMENTS

| | | | |
|---|---|---|---|
| 3,638,640 A | 2/1972 | Shaw | |
| 4,714,341 A | 12/1987 | Hamaguri et al. | |
| 4,805,623 A | 2/1989 | Jöbsis | |
| 4,807,631 A | 2/1989 | Hersh et al. | |
| 4,911,167 A | 3/1990 | Corenman et al. | |
| 4,913,150 A | 4/1990 | Cheung et al. | |
| 4,936,679 A | 6/1990 | Mersch | |
| 4,938,218 A | 7/1990 | Goodman et al. | |
| 4,971,062 A | 11/1990 | Hasebe et al. | |
| 4,972,331 A | 11/1990 | Chance | |
| 4,974,591 A | 12/1990 | Awazu et al. | |
| 5,028,787 A | 7/1991 | Rosenthal et al. | |
| 5,065,749 A | 11/1991 | Hasebe et al. | |
| 5,084,327 A | 1/1992 | Stengel | |
| 5,119,815 A | 6/1992 | Chance | |
| 5,122,974 A | 6/1992 | Chance | |
| 5,167,230 A | 12/1992 | Chance | |
| 5,190,038 A | 3/1993 | Polson et al. | |
| 5,246,003 A | 9/1993 | DeLonzor | |
| 5,247,931 A | 9/1993 | Norwood | |

(Continued)

FOREIGN PATENT DOCUMENTS

DE 19640807 9/1997

(Continued)

OTHER PUBLICATIONS

Cai C., et al., Different Discrete Wavelet Transforms Applied to Denoising Analytical Data. *J. Chem. Inf. Comput. Sci.* 1998, 38, 1161-1170.

(Continued)

*Primary Examiner*—Eric F Winakur

(57) ABSTRACT

A technique is provided for processing a physiological signal. The technique includes performing one or more multi-resolution decompositions on a physiological signal and one or more morphological operations on some or all of the respective decomposition components. In one embodiment, the technique is implemented as iteratively wavelet transformations where morphological operations, such as erosions and dilations, are applied to modify some or all of the respective wavelet coefficients. The modified wavelet coefficients may then be reconstructed to generate a clean version of the physiological signal from which some or all of the noise and/or artifacts have been removed.

33 Claims, 3 Drawing Sheets

U.S. PATENT DOCUMENTS

| | | | |
|---|---|---|---|
| 5,263,244 A | 11/1993 | Centa et al. | |
| 5,275,159 A | 1/1994 | Griebel | |
| 5,279,295 A | 1/1994 | Martens et al. | |
| 5,297,548 A | 3/1994 | Pologe | |
| 5,355,880 A | 10/1994 | Thomas et al. | |
| 5,372,136 A | 12/1994 | Steuer et al. | |
| 5,385,143 A | 1/1995 | Aoyagi | |
| 5,390,670 A | 2/1995 | Centa et al. | |
| 5,413,099 A | 5/1995 | Schmidt et al. | |
| 5,469,845 A | 11/1995 | DeLonzor et al. | |
| 5,482,036 A | 1/1996 | Diab et al. | |
| 5,483,646 A | 1/1996 | Uchikoga | |
| 5,521,851 A | 5/1996 | Wei et al. | |
| 5,553,614 A | 9/1996 | Chance | |
| 5,564,417 A | 10/1996 | Chance | |
| 5,575,285 A | 11/1996 | Takanashi et al. | |
| 5,588,427 A * | 12/1996 | Tien | 600/323 |
| 5,611,337 A | 3/1997 | Bukta | |
| 5,630,413 A | 5/1997 | Thomas et al. | |
| 5,645,059 A | 7/1997 | Fein et al. | |
| 5,645,060 A | 7/1997 | Yorkey | |
| 5,680,857 A | 10/1997 | Pelikan et al. | |
| 5,692,503 A | 12/1997 | Keunstner | |
| 5,730,124 A | 3/1998 | Yamauchi | |
| 5,758,644 A | 6/1998 | Diab et al. | |
| 5,779,631 A | 7/1998 | Chance | |
| 5,782,757 A | 7/1998 | Diab et al. | |
| 5,786,592 A | 7/1998 | Hök | |
| 5,830,136 A | 11/1998 | DeLonzor et al. | |
| 5,830,139 A | 11/1998 | Abreu | |
| 5,831,598 A | 11/1998 | Kauffert et al. | |
| 5,842,981 A | 12/1998 | Larsen et al. | |
| 5,871,442 A | 2/1999 | Madarasz et al. | |
| 5,873,821 A | 2/1999 | Chance et al. | |
| 5,920,263 A | 7/1999 | Huttenhoff et al. | |
| 5,921,937 A * | 7/1999 | Davis et al. | 600/508 |
| 5,995,855 A | 11/1999 | Kiani et al. | |
| 5,995,856 A | 11/1999 | Mannheimer et al. | |
| 5,995,859 A | 11/1999 | Takahashi | |
| 6,011,985 A | 1/2000 | Athan et al. | |
| 6,011,986 A | 1/2000 | Diab et al. | |
| 6,064,898 A | 5/2000 | Aldrich | |
| 6,081,742 A | 6/2000 | Amano et al. | |
| 6,088,607 A | 7/2000 | Diab et al. | |
| 6,094,592 A | 7/2000 | Yorkey et al. | |
| 6,120,460 A | 9/2000 | Abreu | |
| 6,134,460 A | 10/2000 | Chance | |
| 6,150,951 A | 11/2000 | Olejniczak | |
| 6,154,667 A | 11/2000 | Miura et al. | |
| 6,163,715 A | 12/2000 | Larsen et al. | |
| 6,181,958 B1 | 1/2001 | Steuer et al. | |
| 6,181,959 B1 | 1/2001 | Schöllermann et al. | |
| 6,222,189 B1 | 4/2001 | Misner et al. | |
| 6,230,035 B1 | 5/2001 | Aoyagi et al. | |
| 6,266,546 B1 | 7/2001 | Steuer et al. | |
| 6,285,895 B1 | 9/2001 | Ristolainen et al. | |
| 6,312,393 B1 | 11/2001 | Abreu | |
| 6,352,502 B1 | 3/2002 | Chaiken et al. | |
| 6,353,750 B1 | 3/2002 | Kimura et al. | |
| 6,361,501 B1 | 3/2002 | Amano et al. | |
| 6,393,311 B1 | 5/2002 | Edgar et al. | |
| 6,397,091 B2 | 5/2002 | Diab et al. | |
| 6,415,236 B2 | 7/2002 | Kobayashi et al. | |
| 6,419,671 B1 | 7/2002 | Lemberg | |
| 6,438,399 B1 | 8/2002 | Kurth | |
| 6,449,501 B1 * | 9/2002 | Reuss | 600/323 |
| 6,461,305 B1 | 10/2002 | Schnall | |
| 6,466,809 B1 | 10/2002 | Riley | |
| 6,487,439 B1 | 11/2002 | Skladnev et al. | |
| 6,496,711 B1 | 12/2002 | Athan et al. | |
| 6,501,974 B2 | 12/2002 | Huiku | |
| 6,501,975 B2 | 12/2002 | Diab et al. | |
| 6,519,486 B1 | 2/2003 | Edgar et al. | |
| 6,526,301 B2 | 2/2003 | Larsen et al. | |
| 6,544,193 B2 | 4/2003 | Abreu | |
| 6,546,267 B1 | 4/2003 | Sugiura et al. | |
| 6,549,795 B1 | 4/2003 | Chance | |
| 6,580,086 B1 | 6/2003 | Schulz et al. | |
| 6,584,336 B1 | 6/2003 | Ali et al. | |
| 6,587,704 B1 | 7/2003 | Fine et al. | |
| 6,591,122 B2 | 7/2003 | Schmitt | |
| 6,594,513 B1 | 7/2003 | Jobsis et al. | |
| 6,606,509 B2 | 8/2003 | Schmitt | |
| 6,606,511 B1 | 8/2003 | Ali et al. | |
| 6,615,064 B1 | 9/2003 | Aldrich | |
| 6,618,042 B1 | 9/2003 | Powell | |
| 6,622,095 B2 | 9/2003 | Kobayashi et al. | |
| 6,650,918 B2 | 11/2003 | Terry | |
| 6,654,621 B2 | 11/2003 | Palatnik et al. | |
| 6,654,622 B1 | 11/2003 | Eberhard et al. | |
| 6,654,623 B1 * | 11/2003 | Kastle | 600/336 |
| 6,654,624 B2 | 11/2003 | Diab et al. | |
| 6,658,276 B2 | 12/2003 | Kianl et al. | |
| 6,658,277 B2 | 12/2003 | Wasserman | |
| 6,662,030 B2 | 12/2003 | Khalil et al. | |
| 6,668,183 B2 | 12/2003 | Hicks et al. | |
| 6,671,526 B1 | 12/2003 | Aoyagi et al. | |
| 6,671,528 B2 | 12/2003 | Steuer et al. | |
| 6,678,543 B2 | 1/2004 | Diab et al. | |
| 6,684,090 B2 | 1/2004 | Ali et al. | |
| 6,690,958 B1 | 2/2004 | Walker et al. | |
| 6,697,658 B2 | 2/2004 | Al-Ali | |
| 6,708,048 B1 | 3/2004 | Chance | |
| 6,711,424 B1 | 3/2004 | Fine et al. | |
| 6,711,425 B1 | 3/2004 | Reuss | |
| 6,714,245 B1 | 3/2004 | Ono | |
| 6,731,274 B2 | 5/2004 | Powell | |
| 6,778,923 B2 | 8/2004 | Norris et al. | |
| 6,785,568 B2 | 8/2004 | Chance | |
| 6,793,654 B2 | 9/2004 | Lemberg | |
| 6,801,797 B2 | 10/2004 | Mannheimer et al. | |
| 6,801,798 B2 | 10/2004 | Geddes et al. | |
| 6,801,799 B2 | 10/2004 | Mendelson | |
| 6,810,277 B2 | 10/2004 | Edgar et al. | |
| 6,829,496 B2 | 12/2004 | Nagai et al. | |
| 6,850,053 B2 | 2/2005 | Daalmans et al. | |
| 6,863,652 B2 | 3/2005 | Huang et al. | |
| 6,873,865 B2 | 3/2005 | Steuer et al. | |
| 6,889,153 B2 | 5/2005 | Dietiker | |
| 6,898,451 B2 | 5/2005 | Wuori | |
| 6,931,269 B2 | 8/2005 | Terry | |
| 6,939,307 B1 | 9/2005 | Dunlop | |
| 6,947,780 B2 | 9/2005 | Scharf | |
| 6,949,081 B1 | 9/2005 | Chance | |
| 6,961,598 B2 | 11/2005 | Diab | |
| 6,983,178 B2 | 1/2006 | Fine et al. | |
| 6,987,994 B1 | 1/2006 | Mortz | |
| 6,993,371 B2 | 1/2006 | Kiani et al. | |
| 6,996,427 B2 | 2/2006 | Ali et al. | |
| 7,020,507 B2 | 3/2006 | Scharf et al. | |
| 7,024,235 B2 | 4/2006 | Melker et al. | |
| 7,027,849 B2 | 4/2006 | Al-Ali | |
| 7,030,749 B2 | 4/2006 | Al-Ali | |
| 7,035,679 B2 | 4/2006 | Addison et al. | |
| 7,035,697 B2 | 4/2006 | Brown | |
| 7,047,056 B2 | 5/2006 | Hannula et al. | |
| 7,072,702 B2 | 7/2006 | Edgar et al. | |
| 7,079,880 B2 | 7/2006 | Stetson | |
| 7,127,278 B2 | 10/2006 | Melker et al. | |
| 7,162,306 B2 | 1/2007 | Caby et al. | |
| 7,209,775 B2 | 4/2007 | Bae et al. | |
| 7,215,984 B2 | 5/2007 | Diab et al. | |
| 7,215,986 B2 | 5/2007 | Diab et al. | |
| 7,225,013 B2 | 5/2007 | Geva et al. | |

| | | |
|---|---|---|
| 7,236,811 B2 | 6/2007 | Schmitt |
| 7,254,433 B2 | 8/2007 | Diab et al. |
| 7,263,395 B2 | 8/2007 | Chan et al. |
| 7,272,426 B2 | 9/2007 | Schmid |
| 7,289,835 B2 | 10/2007 | Mansfield et al. |
| 7,328,053 B1 | 2/2008 | Diab et al. |
| 7,336,982 B2 | 2/2008 | Yoo |
| 7,343,187 B2 | 3/2008 | Stetson |
| 7,373,193 B2 | 5/2008 | Al-Ali et al. |
| 7,376,453 B1 | 5/2008 | Diab et al. |
| 7,383,070 B2 | 6/2008 | Diab et al. |
| 7,398,115 B2 | 7/2008 | Lynn |
| 7,515,949 B2 * | 4/2009 | Norris .................. 600/336 |
| 2001/0005773 A1 | 6/2001 | Larsen et al. |
| 2001/0020122 A1 | 9/2001 | Steuer et al. |
| 2001/0039376 A1 | 11/2001 | Steuer et al. |
| 2001/0044700 A1 | 11/2001 | Kobayashi et al. |
| 2002/0026106 A1 | 2/2002 | Khalil et al. |
| 2002/0035318 A1 | 3/2002 | Mannheimer et al. |
| 2002/0038079 A1 | 3/2002 | Steuer et al. |
| 2002/0042558 A1 | 4/2002 | Mendelson |
| 2002/0049389 A1 | 4/2002 | Abreu |
| 2002/0062071 A1 | 5/2002 | Diab et al. |
| 2002/0111748 A1 | 8/2002 | Kobayashi et al. |
| 2002/0133068 A1 | 9/2002 | Huiku |
| 2002/0156354 A1 | 10/2002 | Larson |
| 2002/0161287 A1 | 10/2002 | Schmitt |
| 2002/0161290 A1 | 10/2002 | Chance |
| 2002/0165439 A1 | 11/2002 | Schmitt |
| 2002/0198443 A1 | 12/2002 | Ting |
| 2003/0023140 A1 | 1/2003 | Chance |
| 2003/0055324 A1 | 3/2003 | Wasserman |
| 2003/0060693 A1 | 3/2003 | Monfre et al. |
| 2003/0139687 A1 | 7/2003 | Abreu |
| 2003/0144584 A1 | 7/2003 | Mendelson |
| 2003/0220548 A1 | 11/2003 | Schmitt |
| 2003/0220576 A1 | 11/2003 | Diab |
| 2003/0225337 A1 | 12/2003 | Scharf et al. |
| 2004/0010188 A1 | 1/2004 | Wasserman |
| 2004/0054270 A1 | 3/2004 | Pewzner et al. |
| 2004/0054281 A1 | 3/2004 | Adam et al. |
| 2004/0087846 A1 | 5/2004 | Wasserman |
| 2004/0107065 A1 | 6/2004 | Al-Ali |
| 2004/0116788 A1 | 6/2004 | Chernoguz et al. |
| 2004/0127779 A1 | 7/2004 | Steuer et al. |
| 2004/0171920 A1 | 9/2004 | Mannheimer et al. |
| 2004/0176670 A1 | 9/2004 | Takamura et al. |
| 2004/0176671 A1 | 9/2004 | Fine et al. |
| 2004/0193065 A1 | 9/2004 | Houben |
| 2004/0230106 A1 | 11/2004 | Schmitt et al. |
| 2005/0033129 A1 | 2/2005 | Edgar et al. |
| 2005/0049470 A1 | 3/2005 | Terry |
| 2005/0070774 A1 | 3/2005 | Addison et al. |
| 2005/0080323 A1 | 4/2005 | Kato |
| 2005/0101850 A1 | 5/2005 | Parker |
| 2005/0113651 A1 | 5/2005 | Wood et al. |
| 2005/0113656 A1 | 5/2005 | Chance |
| 2005/0131286 A1 | 6/2005 | Parker et al. |
| 2005/0168722 A1 | 8/2005 | Forstner et al. |
| 2005/0177034 A1 | 8/2005 | Beaumont |
| 2005/0192488 A1 | 9/2005 | Bryenton et al. |
| 2005/0192493 A1 | 9/2005 | Wuori |
| 2005/0203357 A1 | 9/2005 | Debreczeny et al. |
| 2005/0209517 A1 | 9/2005 | Diab et al. |
| 2005/0228248 A1 | 10/2005 | Dietiker |
| 2005/0267346 A1 | 12/2005 | Faber et al. |
| 2005/0283059 A1 | 12/2005 | Iyer et al. |
| 2006/0009688 A1 | 1/2006 | Lamego et al. |
| 2006/0015021 A1 | 1/2006 | Cheng |
| 2006/0020181 A1 | 1/2006 | Schmitt |
| 2006/0030763 A1 | 2/2006 | Mannheimer et al. |
| 2006/0052680 A1 | 3/2006 | Diab |
| 2006/0058683 A1 | 3/2006 | Chance |
| 2006/0064024 A1 | 3/2006 | Schnall |
| 2006/0149144 A1 | 7/2006 | Lynn |
| 2006/0155206 A1 | 7/2006 | Lynn |
| 2006/0189880 A1 | 8/2006 | Lynn et al. |
| 2006/0195028 A1 | 8/2006 | Hannula et al. |
| 2006/0200016 A1 | 9/2006 | Diab et al. |
| 2006/0209631 A1 | 9/2006 | Melese et al. |
| 2006/0211930 A1 | 9/2006 | Scharf et al. |
| 2006/0217609 A1 | 9/2006 | Diab et al. |
| 2006/0224058 A1 | 10/2006 | Mannheimer |
| 2006/0247501 A1 | 11/2006 | Ali |
| 2006/0258921 A1 | 11/2006 | Addison et al. |
| 2006/0258927 A1 | 11/2006 | Edgar et al. |
| 2006/0293574 A1 | 12/2006 | Norris |
| 2007/0004977 A1 | 1/2007 | Norris |
| 2007/0213621 A1 | 9/2007 | Reisfeld et al. |
| 2007/0213622 A1 | 9/2007 | Reisfeld |
| 2007/0225581 A1 | 9/2007 | Diab et al. |
| 2007/0249918 A1 | 10/2007 | Diab et al. |
| 2007/0291832 A1 | 12/2007 | Diab et al. |
| 2008/0004514 A1 | 1/2008 | Diab et al. |
| 2008/0033266 A1 | 2/2008 | Diab et al. |
| 2008/0036752 A1 | 2/2008 | Diab et al. |
| 2008/0045823 A1 | 2/2008 | Diab et al. |
| 2008/0066753 A1 | 3/2008 | Martin et al. |

FOREIGN PATENT DOCUMENTS

| | | |
|---|---|---|
| EP | 0630203 | 12/1994 |
| EP | 1491135 | 12/2004 |
| JP | 3170866 | 7/1991 |
| JP | 3238813 | 10/1991 |
| JP | 4191642 | 7/1992 |
| JP | 4332536 | 11/1992 |
| JP | 7124138 | 5/1995 |
| JP | 7136150 | 5/1995 |
| JP | 10216115 | 8/1998 |
| JP | 2003194714 | 7/2003 |
| JP | 2003210438 | 7/2003 |
| JP | 2003275192 | 9/2003 |
| JP | 2003339678 | 12/2003 |
| JP | 2004008572 | 1/2004 |
| JP | 2004113353 | 4/2004 |
| JP | 2004135854 | 5/2004 |
| JP | 2004194908 | 7/2004 |
| JP | 2004202190 | 7/2004 |
| JP | 2004248819 | 9/2004 |
| JP | 2004290545 | 10/2004 |
| WO | WO9101678 | 2/1991 |
| WO | WO9221281 | 12/1992 |
| WO | WO9309711 | 5/1993 |
| WO | WO9403102 | 2/1994 |
| WO | WO9512349 | 5/1995 |
| WO | WO9749330 | 12/1997 |
| WO | WO9842249 | 10/1998 |
| WO | WO9842251 | 10/1998 |
| WO | WO9843071 | 10/1998 |
| WO | WO9932030 | 7/1999 |
| WO | WO0021438 | 4/2000 |
| WO | WO0125802 | 4/2001 |
| WO | WO03000125 | 1/2003 |
| WO | WO 2004/075746 * | 9/2004 |
| WO | WO2004075746 | 9/2004 |
| WO | WO2005009221 | 2/2005 |
| WO | WO2006097437 | 9/2006 |

OTHER PUBLICATIONS

Donoho, D.L., De-Noising by Soft-Thresholding. *Transactions on Information Theory.* May 1995, vol. 41, No. 3.

Donoho, D.L., et al., Threshold Selection for Wavelet Shrinkage of Noisy Data. 1994.

Rusch, T.L., et al., Signal Processing Methods for Pulse Oximetry. *Comput. Biol. Med.* 1996, vol. 26, No. 2, pp. 143-159.

Salamalekis, E., et al., Computerized intrapartium diagnosis of fetal hypoxia based on fetal heart rate monitoring and fetal pulse oximetry recordings utilizing wavelet analysis and neural networks. *BJOG: an International Journal of Obstetrics and Gynecology.* Oct. 2002, vol. 109, pp. 1137-1142.

Tikkanen, P.E., Nonlinear wavelet and wavelet packet denoising of electrocardiogram signal. *Biol. Cybern.* 1999, vol. 80, pp. 259-267.

Rusch, T., et al.; "Signal Processing Methods for Pulse Oximetry," *Computers in Biology and Medicine*, vol. 26, No. 2, pp. 143-159 (Mar. 1996).

Donoho, David L., et al.; "Robust Nonlinear Wavelet Transform based on Median-Interpolation," *Signals, Systems and Computers;* Conference record of the 31st Asilomar Conference in Pacific Grove, California (Nov. 2-5, 1997); *IEEE Comput. Soc.*, vol. 1, pp. 75-79 (Nov. 2, 1997).

Hornegger, Paulus D.; "Applied Pattern Recognition," Friedr. Vieweg & Sohn, Verlagsgesellschaft Mbh., Wiesbaden (1997), pp. 123-126.

Goutsias, John, et al.; "Nonlinear Multiresolution Signal Decomposition Schemes—Part I: Morphological Pyramids," *IEEE Transactions on Image Processing*, vol. 90, No. 11 ( Nov. 2000) 15 pg.

Heijmans, Henk J. A. M., et al.; "Nonlinear Multiresolution Signal Decomposition Schemes—Part II: Morphological Wavelets," *IEEE Transactions on Image Processing*, vol. 90, No. 11 (Nov. 2000) 17 pgs.).

Macey, Katherine E.; "Wavelet Median Denoising of Ultrasound Images," *Medical Imaging, Proceedings of the SPIE*, vol. 4684, pp. 1151-1160 (Feb. 24, 2002).

Sun, Yan, et al.; "ECG Signal Conditioning by Morphological Filtering," *Computers in Biology and Medicine*, vol. 32, No. 6, pp. 465-479 (Nov. 2002).

Aoyagi, T., et al.; "Analysis of Motion Artifacts in Pulse Oximetry," *Japanese Society ME*, vol. 42, p. 20 (1993) (Article in Japanese—contains English summary of article).

Barreto, A.B., et al.; "Adaptive Cancelation of Motion artifact in Photoplethysmographic Blood Volume Pulse Measurements for Exercise Evaluation," *IEEE-EMBC and CEMBC—Theme 4: Signal Processing*, pp. 983-984 (1995).

Vincente, L.M., et al.; "Adaptive Pre-Processing of Photoplethysmographic Blood Volume Pulse Measurements," pp. 114-117 (1996).

Plummer, John L., et al.; "Identification of Movement Artifact by the Nellcor N-200 and N-3000 Pulse Oximeters," *Journal of clinical Monitoring*, vol. 13, pp. 109-113 (1997).

Barnum, P.T., et al.; "Novel Pulse Oximetry Technology Capable of Reliable Bradycardia Monitoring in the Neonate," *Respiratory Care*, vol. 42, No. 1, p. 1072 (Nov. 1997).

Poets, C. F., et al.; "Detection of movement artifact in recorded pulse oximeter saturation," *Eur. J. Pediatr.;* vol. 156, pp. 808-811 (1997).

Masin, Donald I., et al.; "Fetal Transmission Pulse Oximetry," *Proceedings 19th International Conference IEEE/EMBS*, Oct. 30-Nov. 2, 1997; pp. 2326-2329.

Leahy, Martin J., et al.; "Sensor Validation in Biomedical Applications," *IFAC Modelling and Control in Biomedical Systems*, Warwick, UK; pp. 221-226 (1997).

Barreto, Armando B., et al.; "Adaptive LMS Delay Measurement in dual Blood Volume Pulse Signals for Non-Invasive Monitoring," *IEEE*, pp. 117-120 (1997).

East, Christine E., et al.; "Fetal Oxygen Saturation and Uterine Contractions During Labor," *American Journal of Perinatology*, vol. 15, No. 6, pp. 345-349 (Jun. 1998).

Hayes, Matthew J., et al.; "Quantitative evaluation of photoplethysmographic artifact reduction for pulse oximetry," *SPIE*, vol. 3570, pp. 138-147 (Sep. 1998).

Edrich, Thomas, et al.; "Can the Blood Content of the Tissues be Determined Optically During Pulse Oximetry Without Knowledge of the Oxygen Saturation?—An In-Vitro Investigation," *Proceedings of the 20th Annual International conference of the IEEE Engie in Medicine and Biology Society*, vol. 20, No. 6, p. 3072-3075, 1998.

Hayes, Matthew J., et al.; "Artifact reduction in photoplethysmography," *Applied Optics*, vol. 37, No. 31, pp. 7437-7446 (Nov. 1998).

Such, Hans Olaf; "Optoelectronic Non-invasive Vascular Diagnostics Using multiple Wavelength and Imaging Approach," *Dissertation*, (1998).

Todd, Bryan, et al.; "The Identification of Peaks in Physiological Signals," *Computers and Biomedical Research*, vol. 32, pp. 322-335 (1999).

Rhee, Sokwoo, et al.; "Design of a Artifact-Free Wearable Plethysmographic Sensor," *Proceedings of the First joint BMES/EMBS Conference*, Oct. 13-16, 1999, Altanta, Georgia, p. 786.

Rheineck-Leyssius, Aart t., et al.; "Advanced Pulse Oximeter Signal Processing Technology Compared to Simple Averaging: I. Effect on Frequency of Alarms in the Operating Room," *Journal of clinical Anestesia*, vol. 11, pp. 192-195 (1999).

Kaestle, S.; "An Algorithm for Reliable Processing of Pulse Oximetry Signals Under strong Noise Conditions," *Dissertation Book*, Lubeck University, Germany (1999).

Goldman, Julian M.; "Masimo Signal Extraction Pulse Oximetry," *Journal of Clinical Monitoring and Computing*, vol. 16, pp. 475-483 (2000).

Coetzee, Frans M.; "Noise-Resistant Pulse Oximetry Using a Synthetic Reference Signal," *IEEE Transactions on Biomedical Engineering*, vol. 47, No. 8, Aug. 2000, pp. 1018-1026.

Yao, Jianchu, et al.; "Design of a Plug-and-Play Pulse Oximeter," *Proceedings of the Second Joint EMBS/BMES Conference*, Houston, Texas, Oct. 23-26, 2002; pp. 1752-1753.

Kaestle, S.; "Determining Artefact Sensitivity of New Pulse Oximeters in Laboratory Using Signals Obtained from Patient," *Biomedizinische Technik*, vol. 45 (2000).

Cysewska-Sobusaik, Anna; "Metrological Problems With noninvasive Transillumination of Living Tissues," *Proceedings of SPIE*, vol. 4515, pp. 15-24 (2001).

Belal, Suliman Yousef, et al.; "A fuzzy system for detecting distorted plethysmogram pulses in neonates and paediatric patients," *Physiol. Meas.*, vol. 22, pp. 397-412 (2001).

Hayes, Matthew J., et al.; "A New Method for Pulse Oximetry Possessing Inherent Insensitivity to Artifact," *IEEE Transactions on Biomedical Engineering*, vol. 48, No. 4, pp. 452-461 (Apr. 2001).

Gehring, Harmut, et al.; "The Effects of Motion Artifact and Low Perfusion on the Performance of a New Generation of Pulse Oximeters in Volunteers Undergoing Hypoxemia," *Respiratory Care*, Vo. 47, No. 1, pp. 48-60 (Jan. 2002).

Jopling, Michae W., et al.; "Issues in the Laboratory Evaluation of Pulse Oximeter Performance," *Anesth Analg*, vol. 94, pp. S62-S68 (2002).

Gostt, R., et al.; "Pulse Oximetry Artifact Recognition Algorithm for Computerized Anaesthetic Records," *Journal of Clinical Monitoring and Computing Abstracts*, p. 471 (2002).

Chan, K.W., et al.; "17.3: Adaptive Reduction of Motion Artifact from Photoplethysmographic Recordings using a Variable Step-Size LMS Filter," *IEEE*, pp. 1343-1346 (2002).

Yamaya, Yoshiki, et al.; "Validity of pulse oximetry during maximal exercise in normoxia, hypoxia, and hyperoxia," *J. Appl. Physiol.*, vol. 92, pp. 162-168 (2002).

Tremper, K.K.; "A Second Generation Technique for Evaluating Accuracy and Reliability of Second Generation Pulse Oximeters," *Journal of Clinical Monitoring and Computing*, vol. 16, pp. 473-474 (2002).

Cyrill, D., et al.; "Adaptive Comb Filter for Quasi-Periodic Physiologic Signals," *Proceedings of the 25th Annual International Conference of the IEEE EMBS*, Cancun, Mexico, Sep. 17-21, 2003; pp. 2439-2442.

Stetson, Paul F.; "Determining Heart Rate from Noisey Pulse Oximeter Signals Using Fuzzy Logic," *The IEEE International Conference on Fuzzy Systems*, St. Louis, Missouri, May 25-28, 2003; pp. 1053-1058.

Aoyagi, Takuo; "Pulse oximetry: its invention, theory, and future," *Journal of Anesthesia*, vol. 17, pp. 259-266 (2003).

Lee, C.M., et al.; "Reduction of motion artifacts from photoplethysmographic recordings using wavelet denoising approach," *IEEE EMBS Asian-Pacific Conference on Biomedical Engineering*, Oct. 20-22, 2003; pp. 194-195.

Johansson; A.; "Neural network for photoplethysmographic respiratory rate monitoring," *Medical & Biological Engineering & Computing*, vol. 41, pp. 242-248 (2003).

Addison, Paul S., et al.; "A novel time-frequency-based 3D Lissajous figure method and its application to the determination of oxygen saturation from the photoplethysmogram," *Institute of Physic Publishing, Meas. Sci. Technol.*, vol. 15, pp. L15-L18 (2004).

Yao, Jianchu, et al.; "A Novel Algorithm to Separate Motion Artifacts from Photoplethysmographic Signals Obtained With a Reflectance Pulse Oximeter," *Proceedings of the 26th Annual International conference of the IEEE EMBS*, San Francisco, California, Sep. 2004, pp. 2153-2156.

Matsuzawa, Y., et al.; "Pulse Oximeter," *Home Care Medicine*, pp. 42-45 (Jul. 2004); (Article in Japanese—contains English summary of article).

Yan, Yong-sheng, et al.; "Reduction of motion artifact in pulse oximetry by smoothed pseudo Wigner-Ville distribution," *Journal of NeuroEngineering and Rehabilitation*, vol. 2, No. 3 (9 pages) (Mar. 2005).

Huang, J. et al.; "Low Power Motion Tolerant Pulse Oximetry," *Abstracts*, A7, p. S103. (undated).

Lang, P. et al.; "Signal Identification and Quality Indicator™ for Motion Resistant Pulse Oximetry," *Abstracts*, A10, p. S105. (undated).

Hamilton, Patrick S., et al.; "Effect of Adaptive Motion-Artifact Reduction on QRS Detection," *Biomedical Instrumentation & Technology*, pp. 197-202 (undated).

Kim, J.M., et al.; "Signal Processing Using Fourier & Wavelet Transform," pp. II-310-II-311 (undated).

Odagiri, Y.; "Pulse Wave Measuring Device," *Micromechatronics*, vol. 42, No. 3, pp. 6-11 (undated) (Article in Japanese—contains English summary of article).

Yamazaki, Nakaji, et al.; "Motion Artifact Resistant Pulse Oximeter (Durapulse PA 2100)," *Journal of Oral Cavity Medicine*, vol. 69, No. 4, pp. 53 (date unknown) (Article in Japanese—contains English summary of article).

Maletras, Francois-Xavier, et al.; "Construction and calibration of a new design of Fiber Optic Respiratory Plethysmograph (FORP)," *Optomechanical Design and Engineering, Proceedings of SPIE*, vol. 4444, pp. 285-293 (2001).

Relente, A.R., et al.; "Characterization and Adaptive Filtering of Motion Artifacts in Pulse Oximetry using Accelerometers," *Proceedings of the Second joint EMBS/BMES Conference*, Houston, Texas, Oct. 23-26, 2002; pp. 1769-1770.

Neumann, R. et al.; "Fourier Artifact suppression Technology Provides Reliable $SpO_2$," *Abstracts*, A11, p. S105. (undated).

\* cited by examiner

SYSTEM AND METHOD FOR PRE-PROCESSING WAVEFORMS

BACKGROUND OF THE INVENTION

1. Field of the Invention

The present invention relates generally to the processing of waveform data and, more particularly, to the processing of waveforms associated with medical monitoring.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of medicine, doctors often desire to monitor certain physiological characteristics of their patients. Accordingly, a wide variety of devices have been developed for monitoring physiological characteristics. Such devices provide doctors and other healthcare personnel with the information they need to provide the best possible healthcare for their patients. As a result, such monitoring devices have become an indispensable part of modern medicine.

One technique for monitoring certain physiological characteristics of a patient is commonly referred to as pulse oximetry, and the devices built based upon pulse oximetry techniques are commonly referred to as pulse oximeters. Pulse oximetry may be used to measure various blood flow characteristics, such as the blood-oxygen saturation of hemoglobin in arterial blood, the volume of individual blood pulsations supplying the tissue, and/or the rate of blood pulsations corresponding to each heartbeat of a patient.

The quality of these measurements, however, may be adversely affected by a number of factors such as patient motion, subdermal physiological structures, poor sensor operation or fit, poor signal reception and transmission, and so forth. Such factors may result in a pulse oximetry signal which contains artifacts or noise or is otherwise of low or reduced quality. When processed, such a low or reduced quality signal may result in physiological measurements being reported which may not be as accurate or reliable as desired.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided a method for processing a physiological signal, the method including the acts of: performing one or more multi-resolution decompositions on a physiological signal to generate high-passed components and low-passed components; and performing one or more morphological operations on at least one of the high-passed components or the low-passed components generated by the one or more of the respective multi-resolution decompositions.

There is provided one or more machine-readable media, including: a routine configured to perform one or more multi-resolution decompositions on a physiological signal to generate high-passed components and low-passed components; and a routine configured to perform one or more morphological operations on at least one of the high-passed components or the low-passed components generated by the one or more of the respective multi-resolution decompositions.

There is provided a physiological monitoring system, including: a sensor configured to generate a physiological signal; and a monitor configured to display one or more physiological parameters derived from a modified version of the physiological signal, wherein the modified version is generated by performing one or more multi-resolution decompositions on the physiological signal to generate high-passed components and low-passed components, performing one or more morphological operations on at least one of the high-passed components or the low-passed components generated by the one or more of the respective multi-resolution decompositions, and reconstructing the modified version from one or more modified wavelet coefficients generated by the one or more morphological operations.

There is provided a physiological monitoring system, including: a sensor configured to generate a physiological signal; and a monitor configured to perform one or more multi-resolution decompositions on the physiological signal to generate high-passed components and low-passed components, and configured to perform one or more morphological operations on at least one of the high-passed components or the low-passed components generated by the one or more of the respective multi-resolution decompositions.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is desirable to provide an output signal from a pulse oximeter (or other medical monitor) in which the artifacts and/or noise have been removed or reduced. Such a "clean" output signal may then be processed to generate accurate and reliable physiological measurements of interest, such as measurements of blood oxygen level ($SpO_2$), pulse rate, and so forth. In accordance with some aspects of the present technique, an output signal from a medical monitor is pre-processed to remove noise and/or artifacts. The pre-processed signal may then be used to accurately derive the desired physiological measurements of interest.

Figure 1:
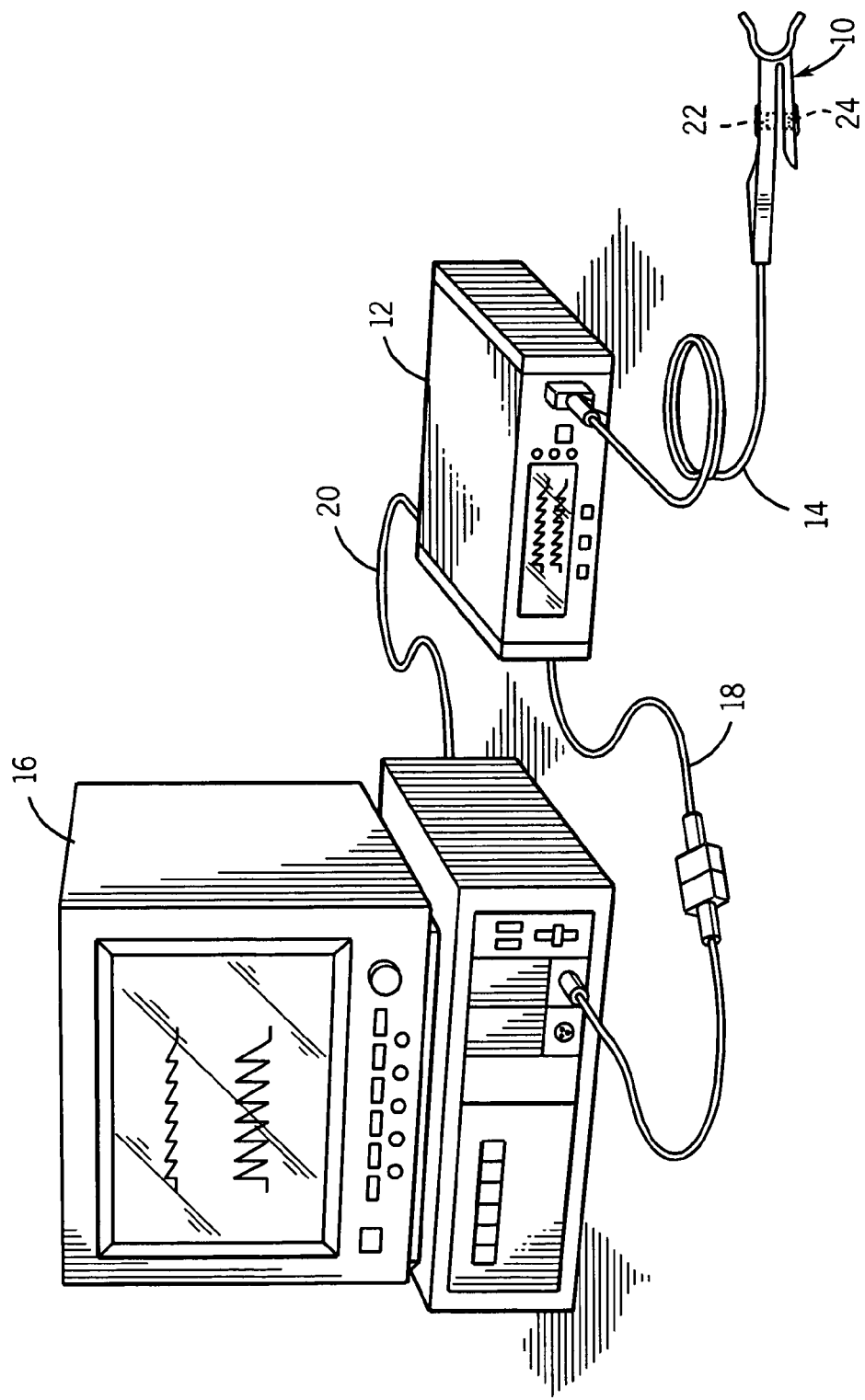
FIG. 1 illustrates a patient monitoring system coupled to a multi-parameter patient monitor and a bi-stable sensor, in accordance with aspects of the present technique.

Turning now to FIG. 1, an exemplary medical monitoring system that may benefit from the present technique is depicted. The exemplary system includes a physiological sensor 10 that may be attached to a patient. The sensor 10 generates an output signal based on a monitored physiological characteristic and transmits the output signal to a patient monitor 12, in accordance with the present technique. In the depicted embodiment, the sensor 10 is connected to the patient monitor 12 via a cable 14 suitable for transmission of the output signal as well as any other electrical and/or optical signals or impulses communicated between the sensor 10 and monitor 12. As will be appreciated by those of ordinary skill in the art, the sensor 10 and/or the cable 14 may include or incorporate one or more integrated circuit devices or electrical devices, such as a memory, processor chip, or resistor, that may facilitate or enhance communication between the sensor 10 and the patient monitor 12. Likewise the cable 14 may be an adaptor cable, with or without an integrated circuit or electrical device, for facilitating communication between the sensor 10 and various types of monitors, including older or newer versions of the patient monitor 12 or other physiological monitors. In other embodiments, the sensor 10 and the patient monitor 12 may communicate via wireless means, such as using radio, infrared, or optical signals. In such embodiments, a transmission device (not shown) may be connected to the sensor 10 to facilitate wireless transmission between the sensor 10 and the patient monitor 12.

In one embodiment, the patient monitor 12 may be a suitable pulse oximeter, such as those available from Nellcor Puritan Bennett Inc. In other embodiments, the patient monitor 12 may be a monitor suitable for measuring other physiological characteristics (such as tissue water fraction, tissue or blood carbon dioxide levels, and so forth) using spectrophotometric or other techniques. Furthermore, the monitor 12 may be a multi-purpose monitor suitable for performing pulse oximetry and/or other physiological and/or biochemical monitoring processes using data acquired via the sensor 10. Furthermore, to provide additional or enhanced functions to those performed by the monitor 12, the patient monitor 12 may be coupled to a multi-parameter patient monitor 16 via a cable 18 connected to a sensor input port and/or via a cable 20 connected to a digital communication port.

As noted above the data provided to the monitor 12 (or, alternatively, to the multi-parameter monitor 16) is generated at the sensor 10. In the example depicted in FIG. 1, the sensor 10 is an exemplary spectrophotometry sensor (such as a pulse oximetry sensor or probe) that includes an emitter 22 and a detector 24 which may be of any suitable type. For example, the emitter 22 may be one or more light emitting diodes adapted to transmit one or more wavelengths of light, such as in the red to infrared range, and the detector 24 may be a photodetector, such as a silicon photodiode package, selected to receive light in the range emitted from the emitter 22. In the depicted embodiment, the sensor 10 is coupled to a cable 14 through which electrical and/or optical signals may be transmitted to and/or from the emitter 22 and detector 24. The sensor 10 may be configured for use with the emitter and detector on the same side of the sensor site (i.e., as a "reflectance type" sensor) or on opposite sides of the sensor site (i.e., as a "transmission type" sensor). During operation, the emitter 22 shines one or more wavelengths of light through the patient's fingertip, or other tissue, and the light received by the detector 24 is processed to determine one or more physiological characteristics of the patient.

For example, for pulse oximetry applications the oxygen saturation of the patient's arterial blood ($SaO_2$) may be determined using two or more wavelengths of light emitted by the emitter 22, most commonly red and near infrared wavelengths. After passage through the patient's tissue, a portion of the light emitted at these wavelengths is detected by the detector 24. The detector generates one or more signals, such an electrical or optical signals, in response to the amount of each wavelength that is detected at a given time. The generated signals may be digital or, where acquired as analog signals, may be digitized in implementations where digital processing and manipulation of the signals is employed. Such digitalization may be performed at the monitor 12 or prior to reaching the monitor 12. The signals, as noted above, may be transmitted via the cable 14 to the monitor 12, where the oxygen saturation or other physiological characteristic is calculated based on the signals. The signals output received by the monitor 12 for processing may be noisy or contain artifacts due to a variety of factors, such as light modulation by subdermal anatomic structures, patient motion during data acquisition, poor sensor operation or fit, poor signal reception and transmission, and so forth. In such instances, the physiological characteristics (such as blood oxygen levels) derived based on such noisy or artifact-containing data signals may in turn be inaccurate or unreliable.

Figure 2:
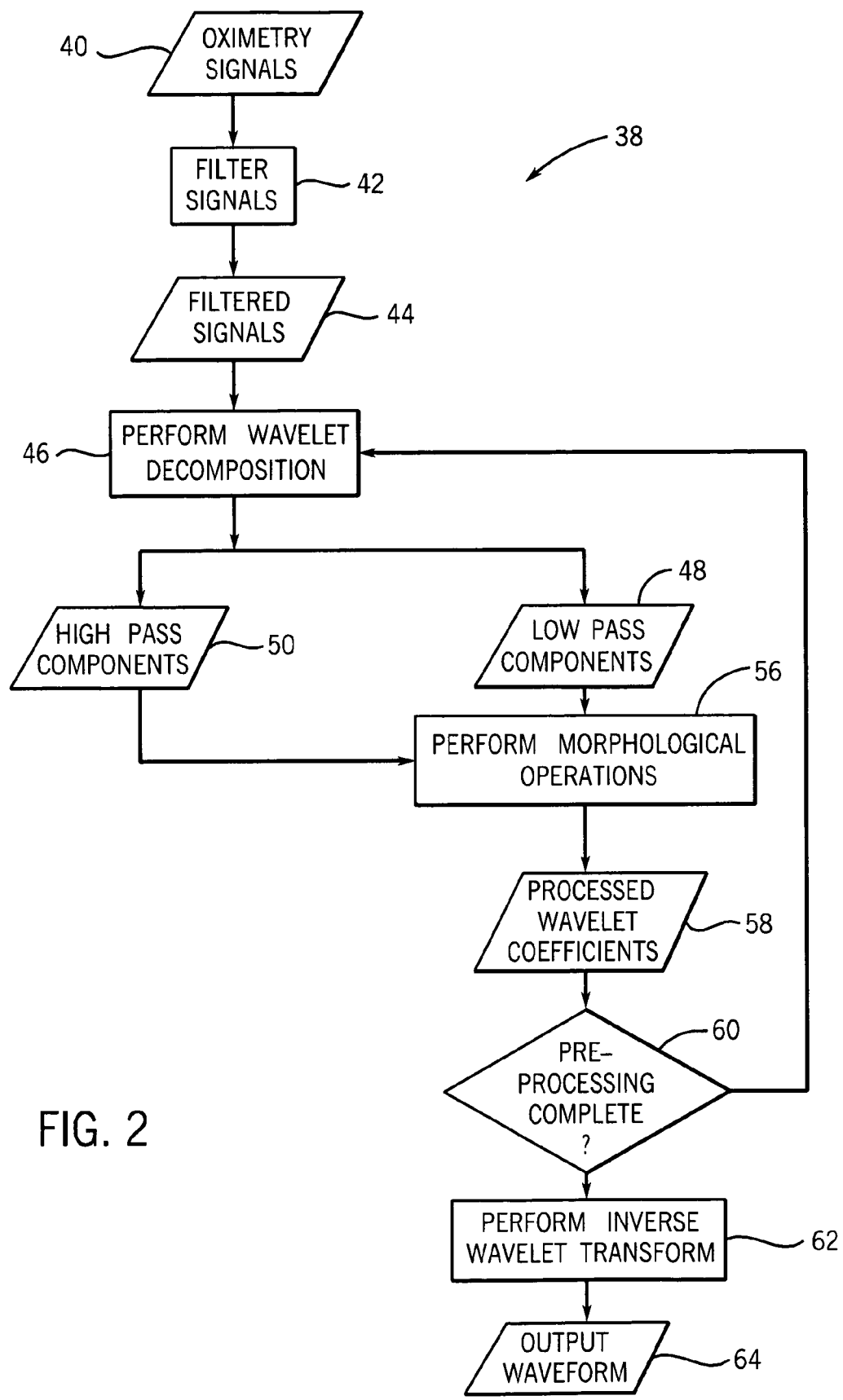
FIG. 2 is a flowchart of exemplary actions performed in accordance with aspects of the present technique.

In an embodiment of the present technique, the output signals are pre-processed prior to deriving the one or more physiological characteristics. An example of such an embodiment is set forth in FIG. 2, depicting a pre-processing technique 38 for use in removing noise and artifacts from a physiological signal. In this example, an oximetry data signal 40, i.e., a plethysmographic waveform, such as may be generated by a sensor 10 suitable for pulse oximetry, is pre-processed to remove artifacts and noise prior to extraction of the desired physiological data. While the pre-processing of the data signal 40 may merely be a prelude to further processing for physiological parameters, one of ordinary skill in the art will appreciate that the pre-processed signal may itself be of interest. For example, the pre-processed signal may itself be monitored or used to generate alarms where appropriate.

In accordance with an embodiment of the present technique, the oximetry data signal 40 may, optionally, be filtered (block 42) to smooth out or remove aspects of the signal 40 which are not believed to be representative of the desired physiological data, thereby generating a filtered signal 44. For example, in one implementation the oximetry signal 40 is median filtered at block 40 to remove outlier noise that may be the result of electronic noise or other non-physiological factors. Such filtered signals 44 may then be further processed in accordance with the present technique.

The oximetry signals 40 (or filtered signals 44) may then be processed using a multi-resolution decomposition technique to decompose the signals into time-frequency or time-scale components, such as by discrete wavelet transformation (block 46) via a filter bank or other multiple or iterative decomposition implementation. Such decompositions provide time and frequency information about the decomposed signal which may be subsequently processed. Though wavelet transformation is discussed herein, those of ordinary skill in the art will appreciate that other transformation techniques capable of providing the desired time and frequency information may also be employed and are within the scope of the present technique.

As will be appreciated by those of ordinary skill in the art, each wavelet decomposition yields a low frequency or low-passed signal component 48 in the form of wavelet coefficients, which corresponds to an approximation of the signal undergoing decomposition, and a high frequency or high-passed signal component 50, which corresponds to detail components of the signal undergoing decomposition. In one implementation, each iteration, i.e., resolution level, of the decomposition decomposes the previous approximation, i.e., low-passed component 48, yielding an approximation and detail component representative of the previous approximation. In other words, the low-passed component 48 at the previous resolution level is decomposed to yield the high-passed 50 and low-passed components 48 of the current resolution level. Because the low-passed components 48 are iteratively decomposed in such an implementation, each previous resolution level may be reproduced by reintegrating the low-passed 48 and high-passed components 50 (i.e., the approximation and details) of the current resolution level. Similarly, the initial signal may be reproduced by reintegrating the current resolution level of approximation and details along with previous resolution levels of detail.

Some or all of the high-passed 50 and/or low-passed 48 filtered components generated at some or all of the decomposition resolution levels may be processed using one or more morphological operations (block 56) to generate modified wavelet coefficients 58 which may be subsequently reconstructed to generate an output waveform with reduced noise and/or artifacts. In one embodiment, the morphological operations smooth out the low-passed components 48 (i.e., approximations) and/or the high-passed components 50 (i.e., the details). For example, morphological operations performed on some or all of the filtered components at selected resolution levels may remove noise, facilitate the detection of transient edges, and/or facilitate the identification of a cutoff scale from which the processed signal will be reconstructed. In this manner, analysis at the subsequent resolution level may be facilitated.

For example, in one embodiment, the oximetry signal 40 (or filtered signal 44) undergoes a three-stage wavelet decomposition to generate the respective high-passed components 50 and low-passed components 48. In one implementation, morphological operations are applied to all three resulting scales generated by the first two rounds of wavelet decomposition. In another implementation, only the two high-pass sub-bands are processed with morphological filters after two rounds of wavelet decomposition. In general, the morphological operations performed may be selected based on the frequency of the respective components, i.e., different morphological filtering schemes may be applied to different frequency ranges or scales of the wavelet transformed signal.

Examples of morphological operations that may be performed at block 56 include dilation and erosion operations or other forms of direction, structural, and/or shape-based filtering operations. Typically in such operations, a shape or pattern is presumed to be present in the data and the filter operation is performed accordingly to emphasize or enhance portions of the data where more points are expected (i.e., a dilation) and/or to remove portions of the data where fewer points are expected (i.e., an erosion). As will be appreciated by those of ordinary skill in the art, different effects may be accomplished in the data by varying the number of erosion and/or dilation operations performed or by varying the order in which an erosion and a dilation operation are performed.

For example, in one embodiment, multiple periods or pulses of waveform data (such as 10 samples) may be analyzed prior to determine an average or underlying shape of the waveform, i.e., the expected structural elements. This average or underlying shape may then be used as a template or expected shape for the subsequent morphological operations. In this way, erosions, dilations, or other morphological operations may be performed on the data to compensate for differences between the measured data and the expected structural elements within the data, thereby compensating for artifacts which may cause deviations from the expected structural elements. As will be appreciated by those of ordinary skill in the art, the structural elements may differ at different resolutions, such as having different amplitudes, slope changes and so forth. Likewise, the artifacts being compensated may be multi-dimensional with their own wavelet components at some or all of the resolution levels. Therefore, identification of structural elements and compensation for artifacts via morphological operations may vary depending on the respective resolution level.

The decomposition and morphological filtering operations may continue until a set number of iterations have been performed or until some other threshold has been reached, as determined at block 60. For instance, in one embodiment, the decomposition process is performed until the difference threshold between successive decomposed components, such as low-passed components 48, is below a desired difference threshold. Such a threshold may be empirically determined from a database of coefficients and differences or by other means. While the present example depicts only the low-passed components 48 as being iteratively decomposed, those of ordinary skill in the art will appreciate that, in other implementations, some or all of the high-passed components 50 may also be iteratively decomposed.

The combination of morphological operations performed at block 56 on the respective high-passed 50 and/or low-passed components 48 result in modified wavelet coefficients 58 which, once pre-processing is determined to be complete at block 60, may be reconstructed (block 62) to generate the desired clean waveform 64. This clean waveform 64, in turn, may be processed to determine one or more physiological characteristics of interest, such as respiratory information, blood oxygen saturation, pulse rate, and so forth.

Figure 3A:
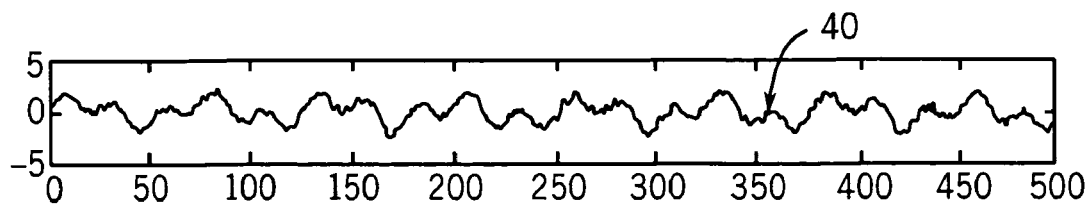
FIG. 3A depicts a waveform representing a pulse oximetry signal to be processed in accordance with aspects of the present technique.
Figure 3B:
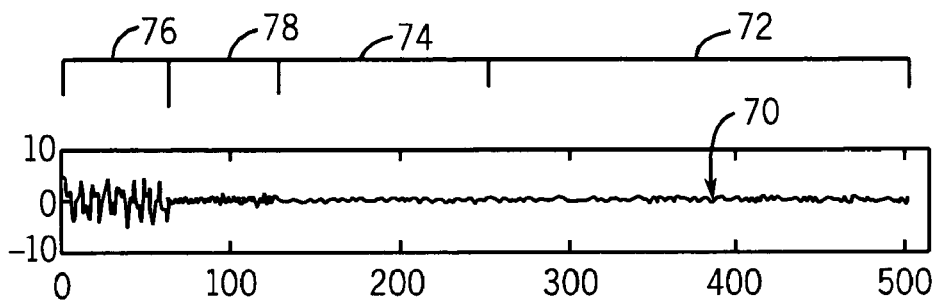
FIG. 3B depicts wavelet transformation of the waveform of FIG. 3A, in accordance with aspects of the present technique.
Figure 3C:
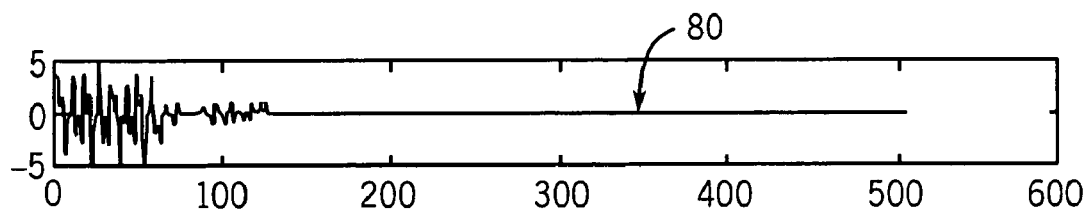
FIG. 3C depicts the wavelet vector of FIG. 3B modified by suitable morphological operations, in accordance with aspects of the present technique.
Figure 3D:
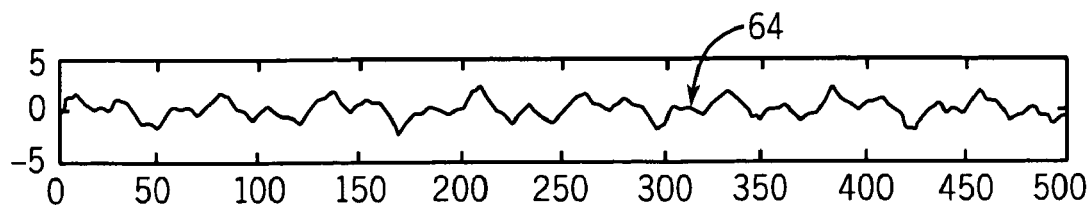
FIG. 3D depicts an output waveform reconstructed from the modified wavelet coefficients of FIG. 3C, in accordance with aspects of the present technique.

Referring now to FIGS. 3A-3D, example waveforms representative of the technique set forth in FIG. 2 are provided for the purpose of illustration. FIG. 3A depicts an oximetry signal 40, as provide in FIG. 2. The signal 40 of FIG. 3A contains noise and artifacts which are undesirable and which may lead to inaccuracies in subsequent data analyses. FIG. 3B depicts a three-stage wavelet decomposition 70 of the original signal 40. The three-stage decomposition 70 includes a first high-passed component 72. The first low-passed component was further decomposed to yield a second high-passed component 74 and a second low-passed component that was in turn subsequently decomposed to generate a third low-passed component 76 and a third high-passed component 78. The third low-passed component 76 represents the approximation data for the original signal while the first, second, and third high-passed components 72, 74, 78 represent different levels of detail. FIG. 3C depicts the modified wavelet vector 80 generated by performing morphological operations (such as erosion and dilation operations) on all the components of the three-stage decomposition 70. Morphological operations can also be applied to only the selected components at certain levels such as the first and second high passed components 72 and 74. The modified wavelet vector 80 provides the wavelet coefficients 58 that may be reconstructed, such as by an inverse wavelet transform, to generate the output waveform 64 of FIG. 2. In such an embodiment, the inverse wavelet transform preserves the original physiological data while allowing artifact compensation, as opposed to techniques using synthesized waveforms (such as triangular synthetic waveforms) where physiological information may be lost. The output waveform 64 is smoothed out relative to the original signal 40 with much of the noise and artifacts of the original signal removed. The output waveform 64 may be provided to subsequent processes for the determination of physiological characteristics of interest, such as blood oxygen saturation, pulse rate and so forth.

As will be appreciated by those of ordinary skill in the art, the techniques and processes discussed herein may be implemented as one or more automated routines or processes which may be stored and/or executed on suitable components of the monitor 12 or multi-parameter monitor 16. Alternatively, to the extent memory components and/or processing components may be provided on the sensor 10 and/or cable 14, 18, or 20, some or all aspects of the present technique may be stored and/or executed by these respective components. Furthermore, different aspects of the present technique may be stored and/or executed on different portions of a suitable physiological monitoring system where such divisions are desirable.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. Indeed, the present techniques may not only be applied to pulse oximetry, but also to other physiological monitor outputs as well.

What is claimed is:

1. A method for processing a physiological signal, the method performed on a processing component and comprising the acts of:
    performing one or more multi-resolution decompositions on a median filtered physiological signal to generate high-passed components and low-passed components; and
    performing one or more morphological operations on at least one of the high-passed components or the low-passed components, wherein the morphological operation is performed based on a shape or pattern presumed to be present in the physiological signal.

2. The method of claim 1, wherein the physiological signal is a waveform.

3. The method of claim 1, wherein the one or more multi-resolution decompositions comprise one or more wavelet decompositions.

4. The method of claim 1, wherein the one or more morphological operations comprise at least one of an erosion or a dilation.

5. The method of claim 1, wherein the physiological signal comprises a pulse oximetry signal.

6. The method of claim 1, wherein the one or more multi-resolution decompositions and the one or more morphological operations are performed iteratively.

7. The method of claim 1, comprising iteratively performing one or more multi-resolution decompositions on respectively generated low-passed components.

8. The method of claim 1, wherein the one or more multi-resolution decompositions are implemented as a filter bank.

9. The method of claim 1, comprising reconstructing an output waveform from one or more modified wavelet coefficients generated by the one or more morphological operations.

10. The method of claim 9, wherein reconstructing the output waveform comprises performing an inverse wavelet transform of the one or more modified wavelet coefficients.

11. The method of claim 9 wherein the output waveform comprises a clean pulse oximetry signal.

12. One or more tangible machine-readable media, comprising routines, which when executed by a processor:
    perform one or more multi-resolution decompositions on a median filtered physiological signal to generate high-passed components and low-passed components; and
    perform one or more morphological operations on at least one of the high-passed components or the low-passed components, wherein the morphological operation is performed based on a shape or pattern presumed to be present in the physiological signal.

13. The one or more tangible machine-readable media of claim 12, wherein the one or more multi-resolution decompositions comprise one or more wavelet decompositions.

14. The one or more tangible machine-readable media of claim 12, wherein the one or more morphological operations comprise at least one of an erosion or a dilation.

15. The one or more tangible machine-readable media of claim 12, wherein the routine configured to perform the one or more multi-resolution decompositions and the routine for performing one or more morphological operations are implemented iteratively.

16. The one or more tangible machine-readable media of claim 12, comprising a routine configured to iteratively perform one or more multi-resolution decompositions on respectively generated low-passed components.

17. The one or more tangible machine-readable media of claim 12, wherein the one or more multi-resolution decompositions are implemented as a filter bank.

18. The one or more tangible machine-readable media of claim 12, comprising a routine configured to reconstruct an output waveform from one or more modified wavelet coefficients generated by the one or more morphological operations.

19. The one or more tangible machine-readable media of claim 18, wherein the routine configured to reconstruct the output waveform performs an inverse wavelet transform of the one or more modified wavelet coefficients.

20. A physiological monitoring system, comprising:
    a sensor configured to generate a physiological signal; and
    a monitor configured to display one or more physiological parameters derived from a modified version of the physiological signal, wherein the modified version is generated by the monitor by median filtering the physiological signal, performing one or more multi-resolution decompositions on the median filtered physiological signal to generate high-passed components and low-passed components, performing one or more morphological operations based on an expected shape or pattern on at least one of the high-passed components or the low-passed components, and reconstructing the modified version from one or more modified wavelet coefficients generated by the one or more morphological operations.

21. The physiological monitoring system of claim 20, wherein the one or more multi-resolution decompositions comprise one or more wavelet decompositions.

22. The physiological monitoring system of claim 20, wherein the one or more morphological operations comprise at least one of an erosion or a dilation.

23. The physiological monitoring system of claim 20, wherein the physiological signal comprises a pulse oximetry signal.

24. The physiological monitoring system of claim 20, wherein the one or more multi-resolution decompositions and the one or more morphological operations are performed iteratively.

25. The physiological monitoring system of claim 20, wherein the one or more multi-resolution decompositions are implemented as a filter bank.

26. A physiological monitoring system, comprising:
a sensor configured to generate a physiological signal; and
a monitor configured to median filter the physiological signal, to perform one or more multi-resolution decompositions on the median filtered physiological signal to generate high-passed components and low-passed components, and to perform one or more morphological operations based on an expected shape or pattern on at least one of the high-passed components or the low-passed components.

27. The physiological monitoring system of claim 26, wherein the one or more multi-resolution decompositions comprise one or more wavelet decompositions.

28. The physiological monitoring system of claim 26, wherein the one or more morphological operations comprise at least one of an erosion or a dilation.

29. The physiological monitoring system of claim 26, wherein the monitor is configured to perform the one or more multi-resolution decompositions and the one or more morphological operations iteratively.

30. The physiological monitoring system of claim 26, wherein the monitor is configured to iteratively perform one or more multi-resolution decompositions on respectively generated low-passed components.

31. The physiological monitoring system of claim 26, wherein the one or more multi-resolution decompositions are implemented as a filter bank.

32. The physiological monitoring system of claim 26, wherein the monitor is configured to reconstruct an output waveform from one or more modified wavelet coefficients generated by the one or more morphological operations.

33. The physiological monitoring system of claim 32, wherein the monitor is configured apply an inverse wavelet transform to the one or more modified wavelet coefficients to reconstruct the output waveform.

* * * * *